(12) United States Patent
Kwan

(10) Patent No.: US 7,322,468 B2
(45) Date of Patent: Jan. 29, 2008

(54) MODULAR DISC STORAGE CASE

(75) Inventor: Tat Ming Kwan, Hong Kong (HK)

(73) Assignee: Tat Tsuen Industrial Ltd., Kwun Tong, Kowloon (HK)

( * ) Notice: Subject to any disclaimer, the term of this patent is extended or adjusted under 35 U.S.C. 154(b) by 294 days.

(21) Appl. No.: 11/043,393

(22) Filed: Jan. 25, 2005

(65) Prior Publication Data

US 2006/0163091 A1     Jul. 27, 2006

(51) Int. Cl.
*B65D 85/57*     (2006.01)
(52) U.S. Cl. .................... 206/308.1; 206/473; 220/847
(58) Field of Classification Search ............ 206/307.1, 206/308.1, 308.3, 425, 473–475, 493, 309–313, 206/445; 211/41.12; 16/221, 225, 227, 16/254, 255, 257; 220/845, 847; 312/9.58
See application file for complete search history.

(56) References Cited

U.S. PATENT DOCUMENTS

| | | | |
|---|---|---|---|
| 3,592,354 A * | 7/1971 | Nielsen ..................... 220/847 |
| 4,670,938 A * | 6/1987 | Fowlston .................... 16/225 |
| 4,892,189 A | 1/1990 | Kunimune et al. |
| 5,381,920 A * | 1/1995 | Lin ........................... 220/847 |
| 5,513,909 A * | 5/1996 | Teich ......................... 16/225 |
| 5,697,498 A * | 12/1997 | Weisburn et al. ........ 206/308.1 |
| 5,729,867 A * | 3/1998 | Carmichael ................. 16/225 |
| 5,799,782 A | 9/1998 | Gelardi |
| 5,904,245 A * | 5/1999 | Tsujino ................... 206/308.1 |
| 6,003,203 A * | 12/1999 | Fowlston .................... 16/225 |
| 2005/0103659 A1 | 5/2005 | Gelardi et al. |

FOREIGN PATENT DOCUMENTS

| | | |
|---|---|---|
| DE | 295 18 620 U 1 | 2/1996 |
| EP | 0 801 012 A1 | 10/1997 |
| WO | WO 2004/071784 A2 | 8/2004 |

* cited by examiner

*Primary Examiner*—Luan K Bui
(74) *Attorney, Agent, or Firm*—McDermott Will & Emery LLP

(57) ABSTRACT

A modular disc storage case comprises a plurality of disc-mounting plates each having an edge that is attached to an edge of an adjacent plate by a spine that comprises a number of hinges that are fastened to at least one of the plates.

21 Claims, 8 Drawing Sheets

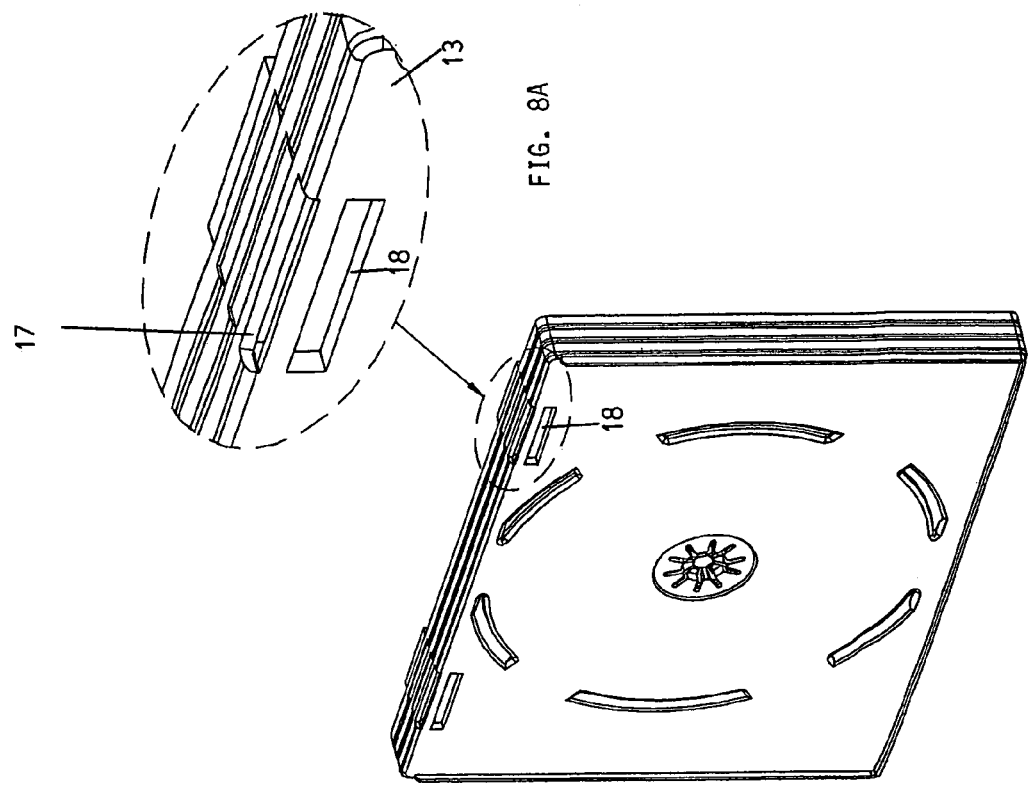
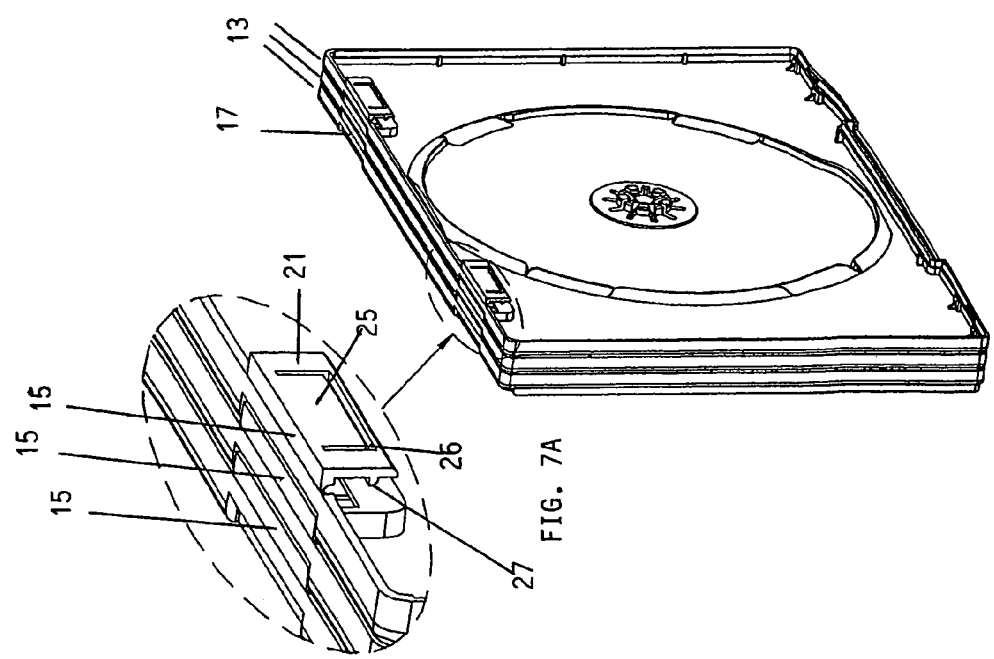

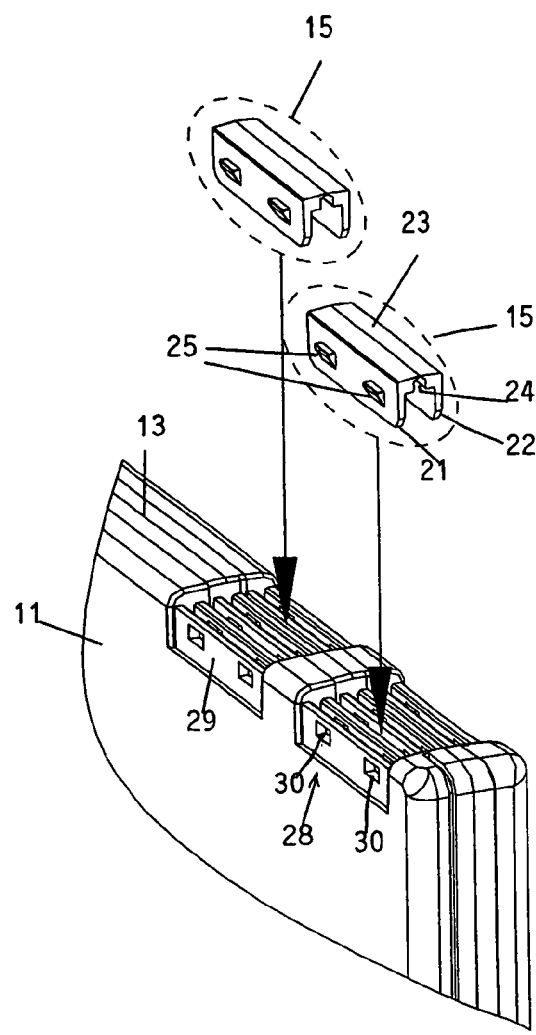
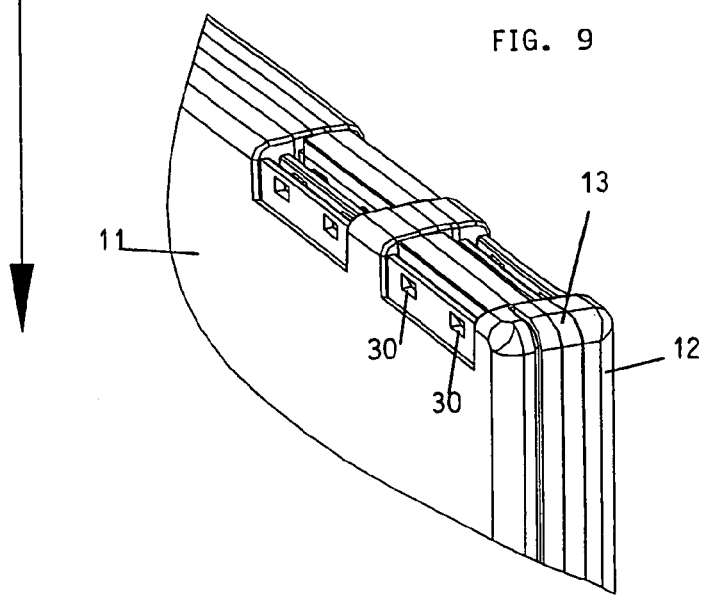
FIG. 9
FIG. 10

MODULAR DISC STORAGE CASE

The present invention relates to storage cases for media discs such as CDs, DVDs, VCDs or the like. More particularly, although not exclusively, the invention relates to a modular DVD keep case comprising a plurality of plates pivotally interconnected by hinges that are fastened to at least one of the plates and wherein as many plates as are desired can be hinged together in modular fashion by a spine comprising the hinges.

BACKGROUND OF THE INVENTION

Most single disc keep cases for DVDs comprise a back plate to which the DVD is mounted, and a front plate hingedly connected to the back plate to cover the DVD when closed. Double disc keep cases also enable mounting of a second disc to the inside surface of the front plate. Keep cases for multiple DVDs can have a fixed number of intermediate disc-mounting plates located between the front and back plates like the pages of the book, but such keep cases are designed with an integrally formed spine of fixed dimension and therefore are limited in their storage capacity to a fixed maximum number of discs. This can be problematic where for example episodes of a series are purchased in piecemeal fashion, or individual CDs containing music or software for example are desired to be stored in an "album". That is, they either have to be stored in separate single disc keep cases, and/or spread over one or more finite sized multiple disc keep cases as the collection grows.

Furthermore, manufacturers of single disc keep cases who also manufacture multiple disc keep cases require separate and expensive tooling and production facilities for each type of case to be manufactured.

OBJECTS OF THE INVENTION

It is an object of the present invention to overcome or substantially ameliorate at least one of the above disadvantage and/or more generally to provide a modular keep case having hinges that are fastened to at least one of the plates to facilitate easy assembly of keep cases having any number of plates between its front and back plates.

SYMMARY OF THE INVENTION

According to the invention, there is provided a modular disc storage case, comprising a plurality of disc-mounting plates each having an edge that is attached to an edge of an adjacent to said plate by a spine that comprises a plurality of hinges that are fastened to at least one of the plates.

Preferably, each plate comprises an aperture at its said edge, and each hinge comprises a first fastening tongue which extends into the aperture of one said plate, and a second fastening tongue which extends into the aperture of an adjacent plate.

In one embodiment, the first fastening tongue is longer than the second fastening tongue.

In the above embodiment, each aperture might comprise a long portion to receive the first fastening tongue and a short portion immediately adjacent to the long portion to receive a second fastening tongue of an adjacent hinge.

Alternatively, the first and second fastening tongues can be of the same length.

Preferably, each aperture receives one fastening tongue of the hinge and one fastening tongue of an adjacent hinge in abutment with one another.

In another embodiment, each plate comprises a pair of adjacent lengthwise aligned apertures at its sa id edge, and pair of said hinges—a first of which comprises a first fastening tongue which extends into one aperture of said pair of apertures and a second fastening tongue which extends of an aperture of an adjacent plate, and a second of which comprises a first fastening tongue which extends into the other aperture of said pair of apertures and a second fastening tongue which extends into an aperture of another adjacent plate.

Preferably, the fastening tongues and apertures each comprise interlocking features preventing unwanted removal of the hinges.

Preferably, the interlocking features comprise resilient snap-engaging tabs.

Preferably, each hinge is formed of resilient plastics material and comprises a bridge extending between the first and second fastening tongues and having a narrow strip therealong to enable repeated bending of the bridge.

Preferably, at least one of the plates comprises an aperture at its said edge, and each hinge comprises a fastening tongue formed integrally with an adjacent one of said plates, which fastening tongue extends into the aperture.

Preferably, the fastening tongue and aperture each comprise an interlocking feature preventing unwanted removal of the fastening tongue from the aperture.

Preferably, the interlocking feature comprises a resilient snap-engaging tab.

Preferably, each hinge is formed of resilient plastics material and comprises a bridge extending from said adjacent plate to the fastening tongues and having a narrow strip therealong to enable repeated bending of the bridge.

BRIEF DESCRIPTION OF DRAWINGS

The invention will now be more particularly, by way of example only, with reference to the drawings, in which:

FIGS. 7 and 7A are perspective views of adjacent closed plates of the storage case of FIG. 6;

FIGS. 8 and 8A are further perspective views of adjacent closed plates of the storage case of FIG. 6;

FIG. 9 is a parts-exploded perspective view of a third embodiment of a modular disc storage case in accordance with the invention;

FIG. 10 is a perspective view of the of the storage case of FIG. 9 in a closed configuration with some of its hinge parts attached and others not yet attached;

DESCRIPTION OF PREFERRED EMBODIMENTS

Figure 1:
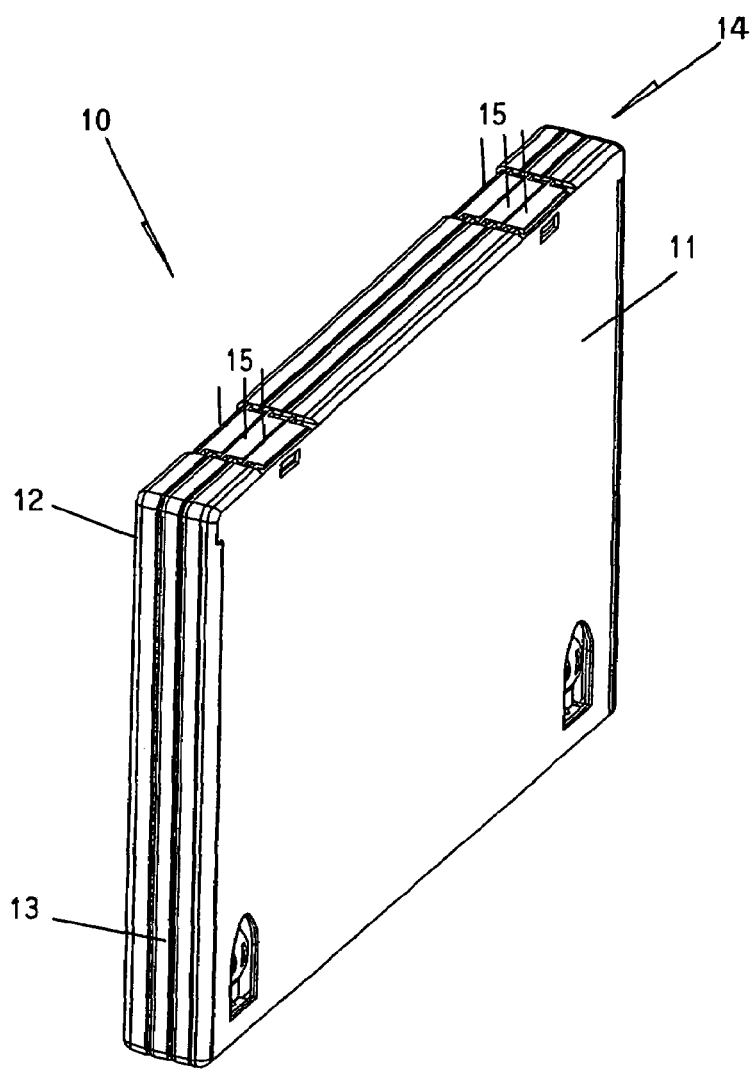
FIG. 1 is a perspective view of a first embodiment of a modular disc storage case in accordance with the invention.
Figure 2:
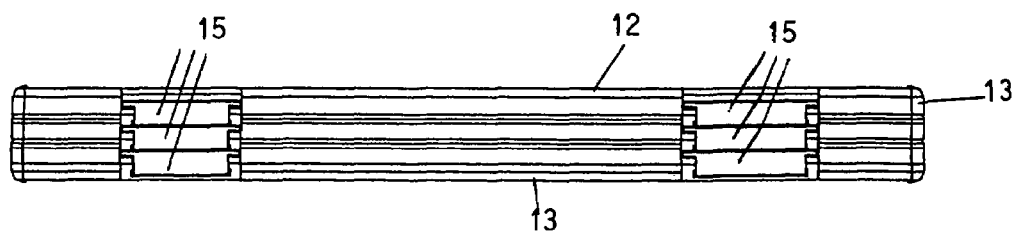
FIG. 2 is an elevational view of the spine of the storage case of FIG. 1.
Figure 3:
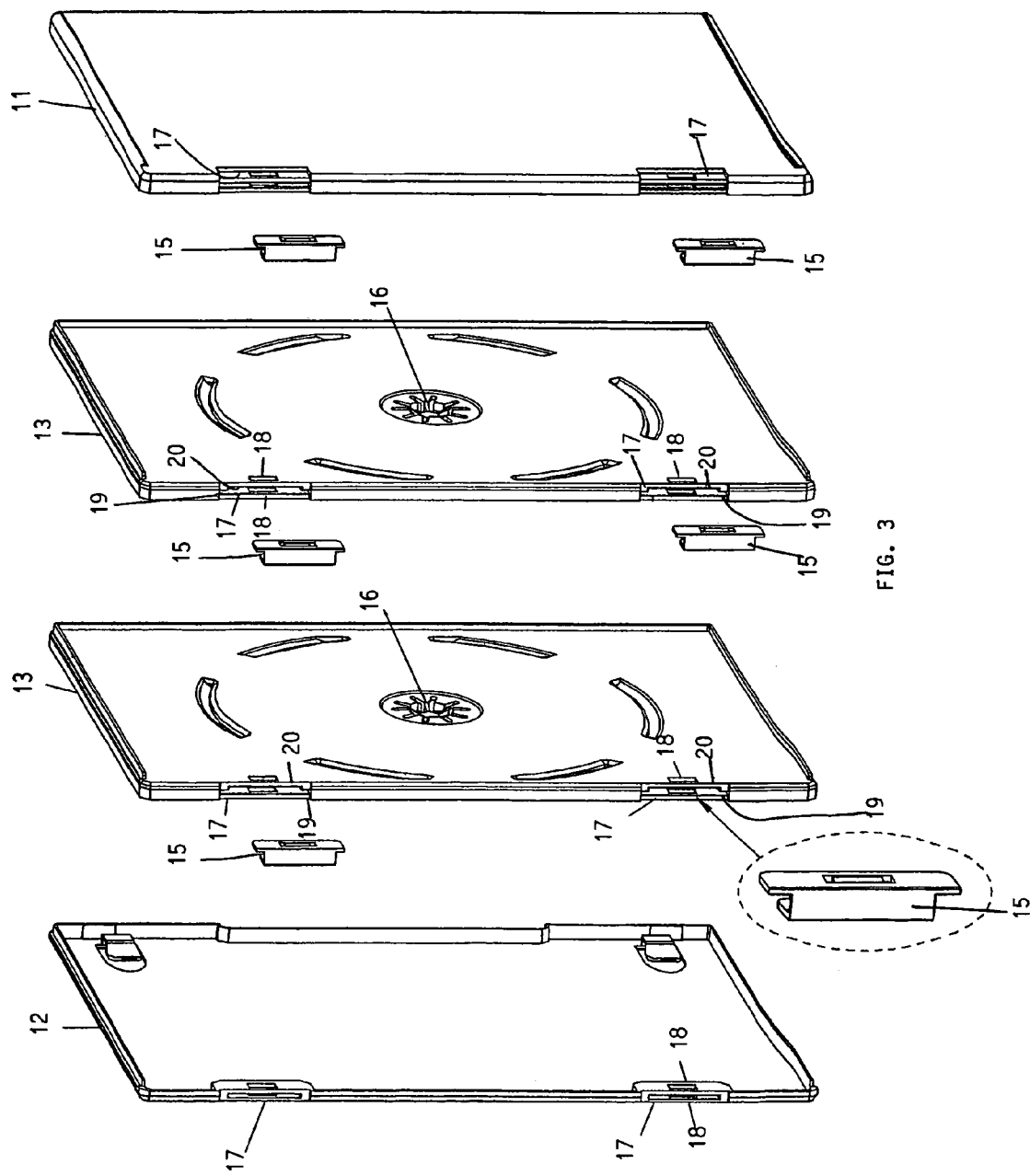
FIG. 3 is a parts-exploded perspective view of the storage case of FIG. 1.
Figure 4:
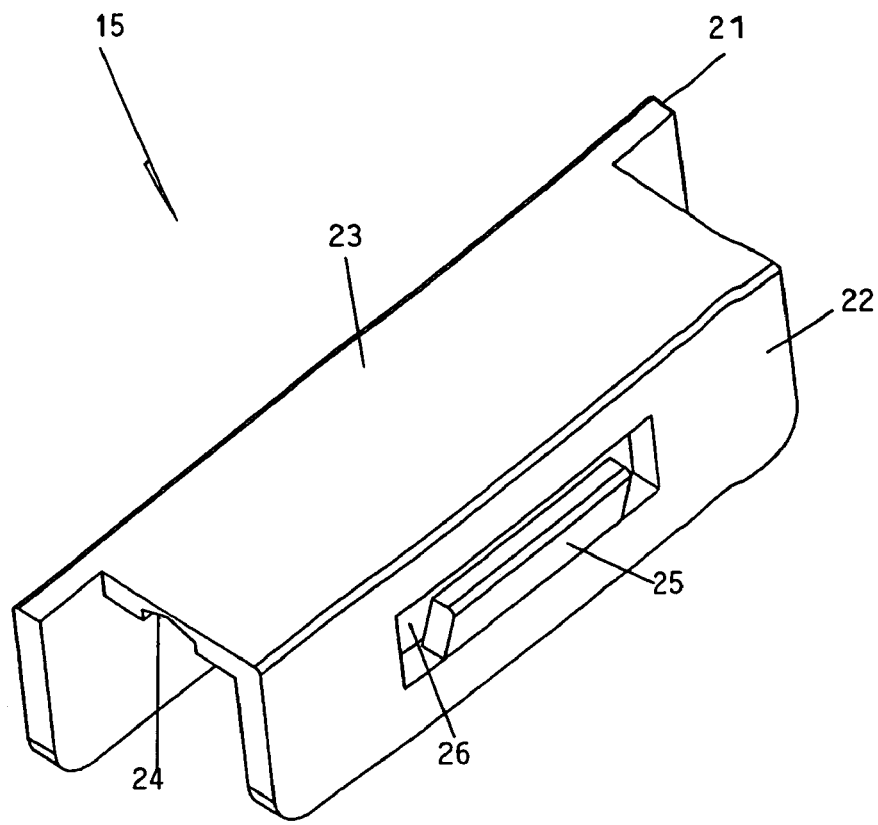
FIG. 4 is a perspective view of a hinge of the storage case of FIG. 1.

In FIGS. 1 to 5 of the accompanying drawings there is depicted schematically various components of a modular disc storage case 10 embodying the invention for storing DVD discs for example, i.e. a DVD keep case. A first embodiment of the DVD keep case 10 includes a front cover plate 11 and a back cover plate 12 and an intermediate plate 13 disposed therebetween. The plates 11, 12 and 13 are made of plastics material known in the art of DVD keep cases. One, none or both of the front and back cover plates 11 and 12 might have a DVD-mounting boss on its inner side and the intermediate plate(s) 13 would have a DVD mounting boss 16 on one or both of its sides so that the case 10 can store multiple DVDs.

At one edge of the case 10 a spine 14 hingedly interconnects the plates 11, 12 and 13 using a number of separately fabricated hinge members 15. Where it is desired to include further intermediate plates 13, further hinge members 15 can be provided.

Each plate 11/12/13 includes a pair of slots 17 at the spine edge of the plate 11/12/13. Each slot 17 includes a long portion 19 and a short portion 20 alongside the long portion 19. Positioned behind each slots 17 and at either side thereof is a pair of opposed recesses 18.

Figure 5:
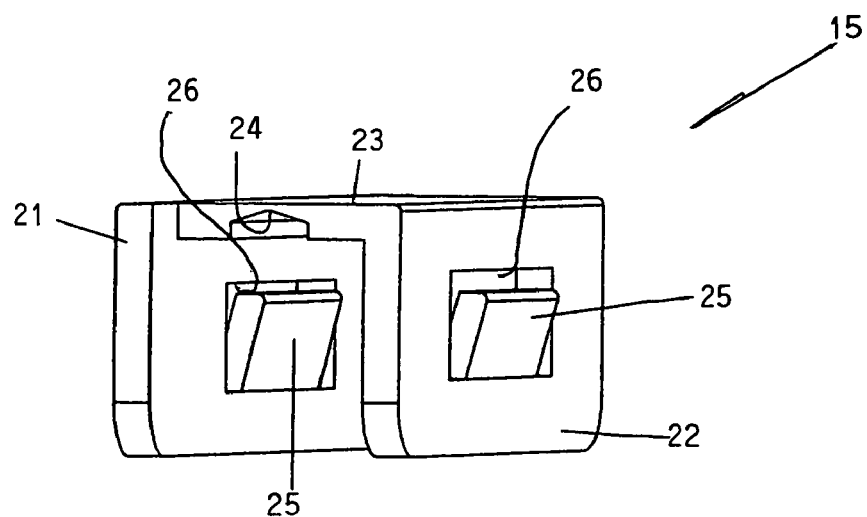
FIG. 5 is another perspective view of the hinge of FIG. 4.
Figure 6:
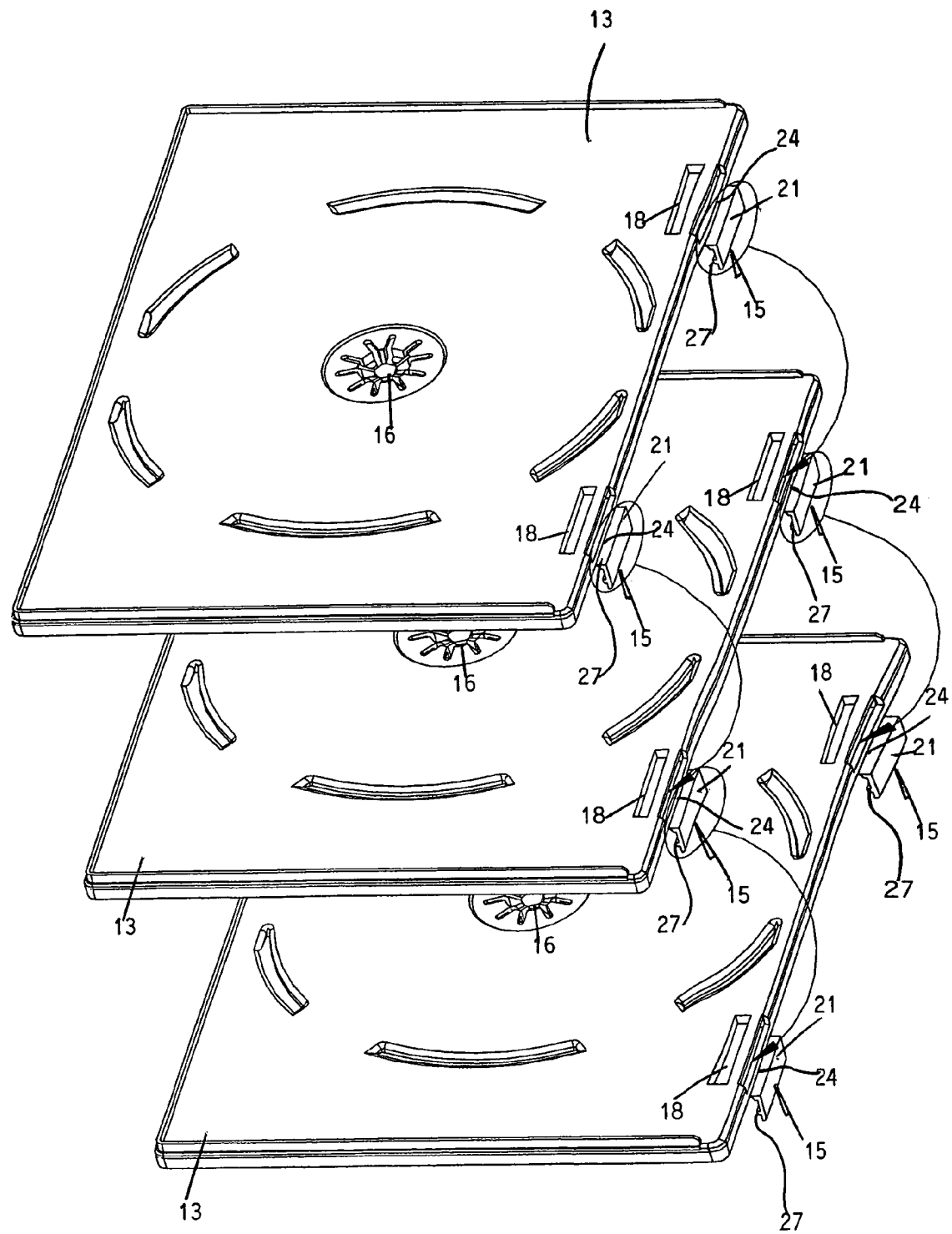
FIG. 6 is parts-exploded perspective view of plates of a second embodiment of a modular disc storage case in accordance with the invention.
Figure 11:
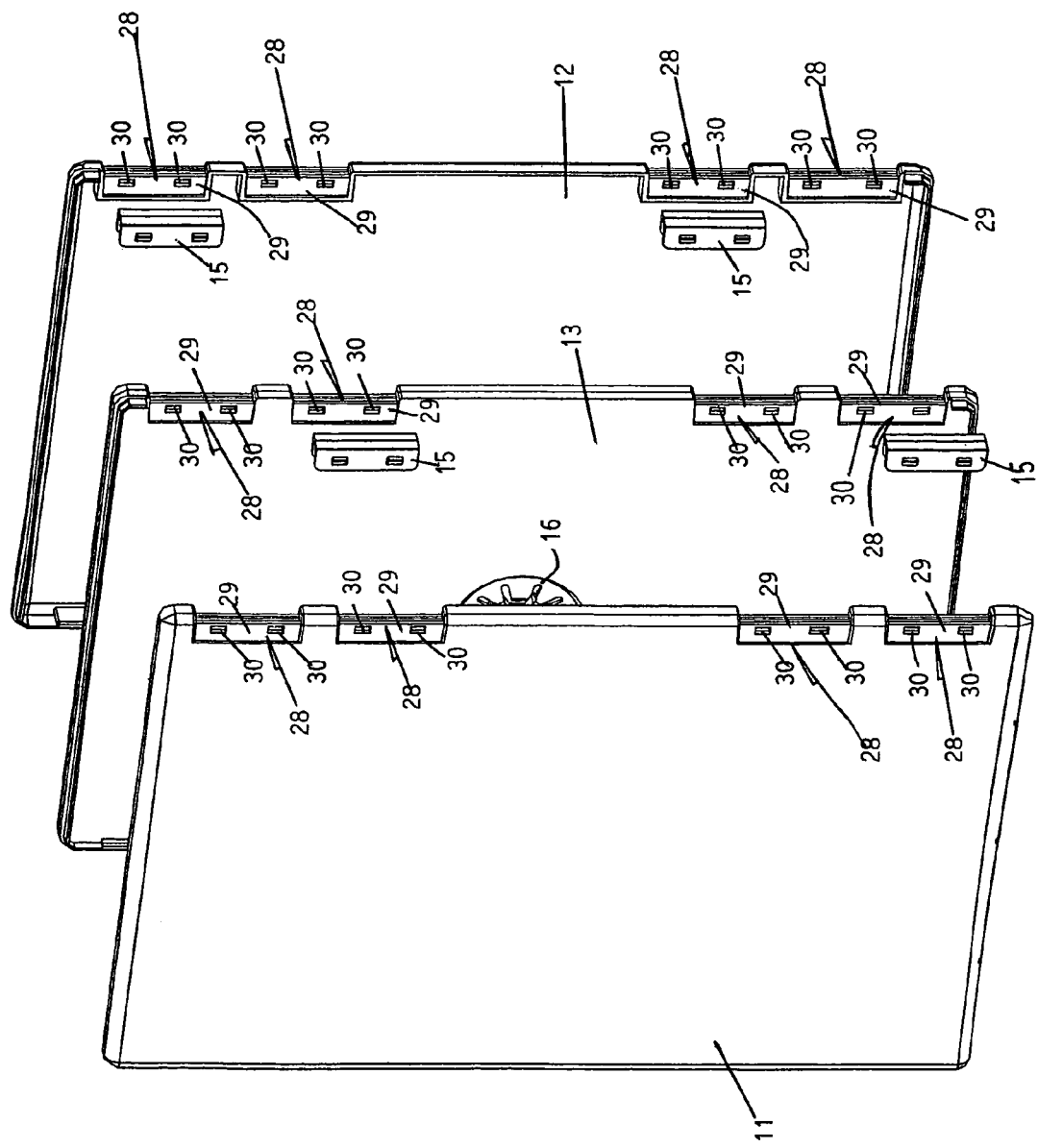
FIG. 11 is a parts-exploded perspective view of the storage case of FIG. 9.
Figure 12:
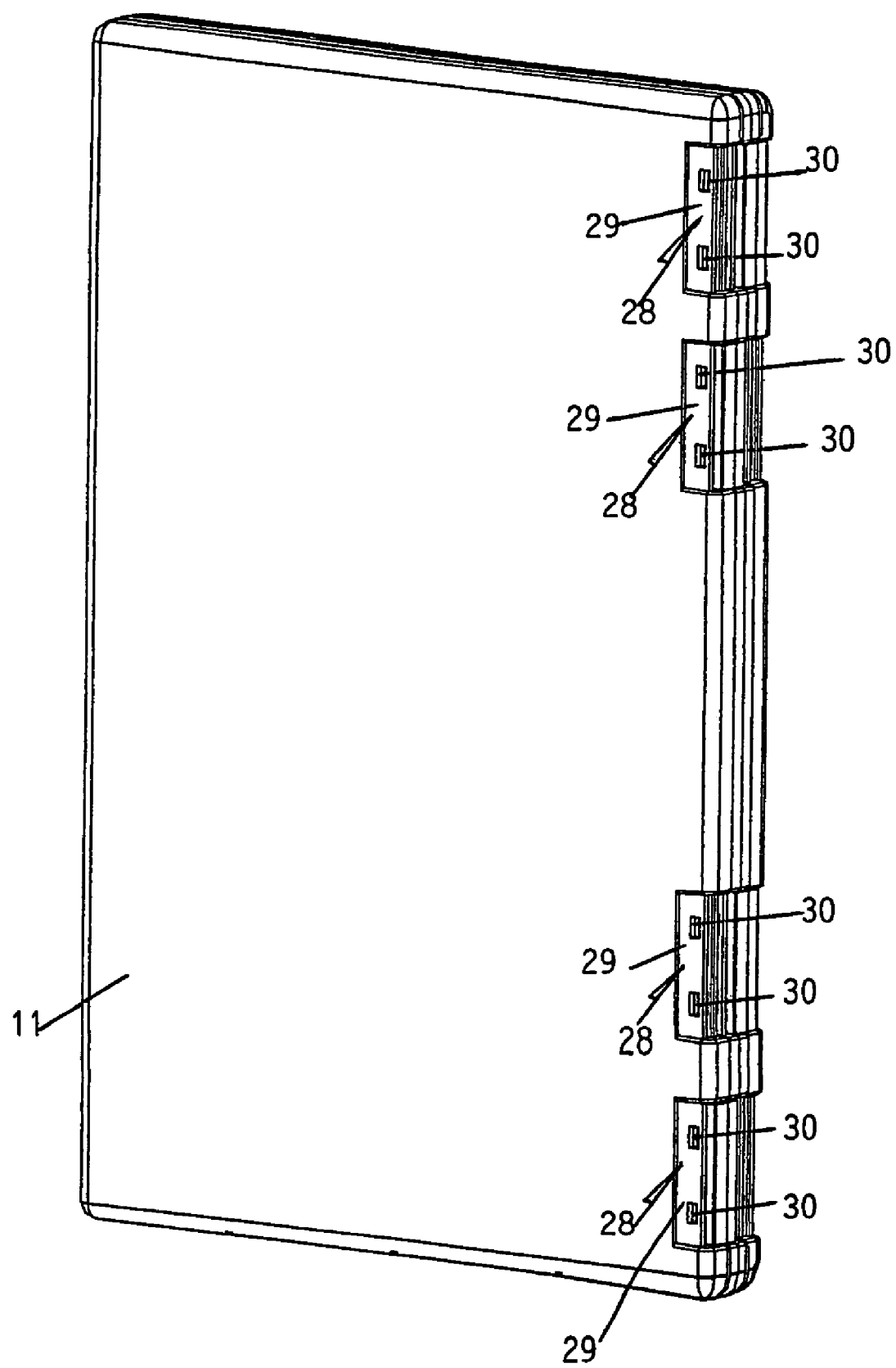
FIG. 12 is a perspective view of the storage case of FIG. 9 in a closed configuration without its hinge parts attached.

Each hinge member 15 includes a first fastening tongue 21 and a second fastening tongue 22 formed integrally with one another and connected by a bridge 23 having an elongate narrow bending strip 24 formed therealong. The bending strip 24 enables the hinge 15 to open and close as desired. The first and second fastening tongues 21 and 22 each include a snap-engagement tab 25 formed integrally therewith and located within respective openings 26 and are angled slightly so as to project out of the plane of the respective fastening tongue 21/22. As shown in FIG. 5, both of the tabs 25 project in the same direction. Moreover, the tab 25 of the longer fastening tongue 21 extends toward the shorter fastening tongue 22 and the tab 25 of the shorter fastening tongue 22 extends away from the longer fastening tongue 21. In order to hingedly connect adjacent plates at the spine 14 of the DVD case 10, the first fastening tongue 21 of hinge member 15 is pressed into the long portion 19 of one of the slots 17. The snap-engagement tab 25 of the first fastening tongue 21 snaps into one of the recesses 18. At the same time or afterwards, the second fastening tongue 22 presses into the short portion 20 of the slot 17 of the neighbouring plate. The snap-engaging tab 25 of the second fastening tongue 22 snaps into the adjacent recess 18 alongside the short portion 20 of the slot 17 of the said neighbouring plate.

As can be seen, the hinge members 15 can be installed in on one orientation only, by virtue of the different lengths of the first and second fastening tongues 21 and 22. This ensures that the snap-engagement tabs 25 are correctly oriented and therefore each recess 18 of the DVD keep case 10 can receive only one snap-engagement tab 25 (i.e. it is not possible to cause a pair of snap-engagement tabs 25 to enter a single recess 18 from opposite sides).

A DVD keep case 10 made in accordance with the second embodiment is depicted in FIGS. 6 to 8 and 8A. In these figures, only the intermediate plates 13 are depicted, but front and back plates would typically be included. Each intermediate plate 13 has formed integrally therewith a hinge member 15 attached permanently to an edge thereof by means of narrow bending strip 24 from which a single fastening tongue 21 extends. Each fastening tongue 21 includes an inwardly facing lip 27 and an in-plane tab 25 located within an opening 26 (see FIG. 7A).

At the spine edge of each plate 13 there is a slot 17 and an adjacent recess 18. The fastening tongue 21 of one plate 13 can enter the slot 17 of a neighbouring plate 13. In this embodiment, the tab 25 of the fastening tongue is not intended to deform. Instead, the parts of the fastening tongue 21 surrounding the opening 26 deform elastically as the fastening tongue 21 is inserted into the slot 17 of the neighbouring plate 13 as the lip 27 snaps into place in the recess 18. Should it be desired to remove one or more plates 13 from the DVD keep case 10, the parts of the fastening tongue 21 surrounding the opening 26 can easily be lifted by a user to withdraw the lip 27 from the recess 18, thus enabling withdrawal of the fastening tongue 21 from slot 17.

A third DVD keep case 10 embodying the invention is depicted in FIGS. 9 to 12, which is of a slim-line design in which the individual plates 13 are quite thin. To this end, the hinges 15 are intended to be attached in offset manner to the plates 11, 12 and 13 as shown in FIG. 9. Moreover, limitations to the thickness of each plate 13 are not significantly affected by the width dimension of each hinge member 15 and adjacent plates in a DVD keep case 10 hinge together by only a pair of hinge members 15 (not four).

As shown in the figures, each plate 11, 12 and 13 comprises four rebates 28 across each of which there extends in a longitudinal direction an anchor web 29 having a pair of transverse apertures 30 therethrough.

Each hinge member 15 comprises a pair of fastening tongues 21 and 22, each typically of the same length and characteristics. A bridge 23 is formed integrally with each fastening tongue 21/22 and includes a narrow strip 24 similar to that described with reference to the first embodiment. In the third embodiment however, each fastening tongue 21, 22 includes a pair of outwardly facing resilient tabs 25 formed as small solid ramps extending outwardly from the respective tongues 21/22.

As shown by the arrows in FIG. 9, the hinges 15 are pressed into the respective rebates 28 such that the fastening tongues 21 and 22 of one hinge member 15 flank the anchor web 29 of one plate and the fastening tongues 21 and 22 of a lengthwise adjacent hinge member 15 flank the anchor web 29 of the adjacent plate. In other words, the first fastening tongue 21 of one hinge member 15 is longitudinally aligned with the second fastening tongue 22 of the lengthwise adjacent hinge member 15. When the hinge members 15 are pressed into position in the respective rebates 28, the tabs 25 snap-engage into the respective apertures 30 to prevent removal of the hinge members 15 once so positioned.

It should be appreciated that modifications and alterations obvious to those skilled in the art are not to be considered as beyond the scope of the present invention.

For example, separately manufactured hinges of any suitable form and correspondingly formed receiving slots in each plate are envisaged. Furthermore, although the preferred embodiment is a described as DVD keep cases 10, they could be used for storing disks other than DVDs.

The invention claimed is:
1. A modular disc storage case, comprising:
a plurality of disc-mounting plates, each having an edge that is attached to an edge of an adjacent plate by a spine, the spine comprising a plurality of hinges that are fastened to at least one of the plates;
wherein each plate comprises an aperture at its said edge, and each hinge comprises a first fastening tongue which extends into the aperture of one said plate, and a second fastening tongue which extends into the aperture of an adjacent plate;

wherein the first fastening tongue is longer than the second fastening tongue; and wherein each aperture comprises a long portion to receive the first fastening tongue and a short portion immediately adjacent to the long portion to receive a second fastening tongue of an adjacent hinge.

2. The disc storage case as claimed in claim 1, wherein the fastening tongues and the apertures each comprise interlocking features preventing unwanted removal of the hinges.

3. The disc storage case as claimed in claim 2, wherein the interlocking features comprise resilient snap-engaging tabs.

4. The disc storage case as claimed in claim 1, wherein each hinge is formed of a resilient plastic materials, and comprises a bridge extending between the first and the second fastening tongues, the bridge having a narrow strip extending between the first and the second fastening tongues to enable repeated bending of the bridge.

5. A modular disc storage case, comprising:
a plurality of disc-mounting plates, each having an edge that is attached to an edge of an adjacent plate by a spine, the spine comprising a plurality of hinges that are fastened to at least one of the plates;

wherein each plate comprises an aperture at its said edge, and each hinge comprises a first fastening tongue which extends into the aperture of one said plate, and a second fastening tongue which extends into the aperture of an adjacent plate;

wherein the first and second fastening tongues are of the same length; and wherein each aperture receives one fastening tongue of the hinge and one fastening tongue of an adjacent hinge in abutment with one another.

6. The disc storage case as claimed in claim 5, wherein the fastening tongues and the apertures each comprise interlocking features preventing unwanted removal of the hinges.

7. The disc storage case as claimed in claim 6, wherein the interlocking features comprise resilient snap-engaging tabs.

8. The disc storage case as claimed in claim 5, wherein each hinge is formed of a resilient plastic material, and comprises a bridge extending between the first and the second fastening tongues, the bridge having a narrow strip therealong to enable repeated bending of the bridge.

9. A modular disc-storage case, comprising:
a first disc-mounting plate and a second disc-mounting plate, the first and second disc-mounting plates each comprising a slot along one edge of the disc-mounting plate, the slot comprising first and second opposing walls, wherein a first aperture extends through the first opposing wall and a second aperture extends through the second opposing wall; and a hinge member comprising a first fastening tongue and a second fastening tongue, the first fastening tongue comprising a first interlocking element and the second fastening tongue comprising a second interlocking element;

wherein the first interlocking element of the hinge member engages the first aperture of the first disc-mounting plate and the second interlocking element of the hinge member engages the second aperture of the second disc-mounting plate.

10. The modular disc-storage case of claim 9, wherein the first interlocking element is configured to be disconnected from the first aperture by applying a pressure to a surface of the first interlocking element.

11. The modular disc storage case of claim 9, wherein the second interlocking element is configured to be disconnected from the second aperture by applying a pressure to a surface of the second interlocking element.

12. The modular disc-storage case of claim 9, wherein the first fastening tongue is longer than the second fastening tongue.

13. The modular disc-storage case of claim 9, wherein the first and second fastening tongues are about the same length.

14. The modular disc-storage case of claim 9, wherein each of the interlocking elements inhibits unwanted removal of the hinge member.

15. The modular disc-storage case of claim 9, wherein the first and second interlocking elements comprise resilient snap-engaging tabs.

16. The modular disc-storage case of claim 9, wherein the hinge member is formed of a resilient plastic material and comprises a bridge extending between the first and second fastening tongues, the bridge having a narrow strip extending between the first and second fastening tongues to enable repeated bending of the bridge.

17. A modular disc-storage case comprising:
a first disc-mounting plate defining a first plane having a first slot comprising opposing first and second walls, each of the first wall and second wall substantially parallel to the first plane, the first wall comprising a first interlocking element and the second wall comprising a second interlocking element;

a second disc-mounting plate defining a second plane having a second slot comprising opposing third and fourth walls, each of the third wall and fourth wall substantially parallel to the second plane, the third wall comprising a third interlocking element and the fourth wall comprising a fourth interlocking element; and a hinge member comprising a fifth interlocking element and a sixth interlocking element;

wherein the fifth interlocking element is configured to couple with the first interlocking element and the sixth interlocking element is configured to couple with the third interlocking element.

18. The modular disc-storage case of claim 17, wherein the fifth interlocking element is configured to be disconnected from the first interlocking element by applying a pressure to a surface of the fifth interlocking element.

19. The modular disc storage case of claim 17, wherein the sixth interlocking element is configured to be disconnected from the third interlocking element by applying a pressure to a surface of the sixth interlocking element.

20. The modular disc-storage case of claim 17, wherein each of the interlocking elements inhibits unwanted removal of the hinge member.

21. The modular disc-storage case of claim 17, wherein the fifth and sixth interlocking elements comprise resilient snap-engaging tabs.

* * * * *